United States Patent
Decerle et al.

(10) Patent No.: US 9,551,350 B2
(45) Date of Patent: Jan. 24, 2017

(54) DEVICE FOR UNCOUPLING A BEARING CARRIER

(75) Inventors: Eric Nicolas Decerle, Savigny le Temple (FR); Regis Eugene Henri Servant, Vigneux sur Seine (FR)

(73) Assignee: SNECMA, Paris (FR)

( * ) Notice: Subject to any disclaimer, the term of this patent is extended or adjusted under 35 U.S.C. 154(b) by 844 days.

(21) Appl. No.: 13/824,642

(22) PCT Filed: Nov. 25, 2011

(86) PCT No.: PCT/FR2011/052772
§ 371 (c)(1),
(2), (4) Date: May 23, 2013

(87) PCT Pub. No.: WO2012/069773
PCT Pub. Date: May 31, 2012

(65) Prior Publication Data
US 2013/0236291 A1    Sep. 12, 2013

(30) Foreign Application Priority Data
Nov. 26, 2010    (FR) ..................... 10 59820

(51) Int. Cl.
*F01D 21/00*    (2006.01)
*F04D 29/056*   (2006.01)
(Continued)

(52) U.S. Cl.
CPC ......... *F04D 29/0563* (2013.01); *F01D 21/045* (2013.01); *F01D 25/162* (2013.01);
(Continued)

(58) Field of Classification Search
CPC .... F04D 29/0563; F01D 21/045; F16B 31/021
See application file for complete search history.

(56) References Cited

U.S. PATENT DOCUMENTS 2,605,806 A * 8/1952 Tinnerman ............ F16B 37/044
                                                    220/3.5
2,971,425 A * 2/1961 Blakeley ............... B25B 31/005
                                                     411/28
(Continued)

FOREIGN PATENT DOCUMENTS

EP    2 071 138    6/2009
FR    2 877 046    4/2006

OTHER PUBLICATIONS

International Search Report Issued Mar. 7, 2012 in PCT/FR11/52772 Filed Nov. 25, 2011.

*Primary Examiner* — Craig Kim
*Assistant Examiner* — Jason Fountain
(74) *Attorney, Agent, or Firm* — Oblon, McClelland, Maier & Neustadt, L.L.P.

(57) ABSTRACT

A device for uncoupling a bearing carrier in a turbomachine, the bearing carrier including an upstream part and a downstream part including a plurality of upstream orifices respectively facing a plurality of downstream orifices. The uncoupling device includes rupture screws each passing through an upstream orifice and a downstream orifice, and at least a mechanism for double centering of a rupture screw with respect to the upstream orifice and to the downstream orifice respectively. The mechanism for double centering is independent of the upstream and downstream parts of the bearing carrier and of the rupture screw, and is configured to collaborate with the upstream part of the rupture screw such that when the rupture screw breaks, the upstream part carries with it the mechanism for double centering. A turbomachine can include such an uncoupling device.

9 Claims, 3 Drawing Sheets

(51) Int. Cl.
*F01D 21/04* (2006.01)
*F01D 25/16* (2006.01)
*F02C 7/06* (2006.01)
*F16B 31/02* (2006.01)
*F16D 9/06* (2006.01)

(52) U.S. Cl.
CPC .............. *F02C 7/06* (2013.01); *F16B 31/028* (2013.01); *F16D 9/06* (2013.01); *F05B 2260/3011* (2013.01); *F05D 2230/64* (2013.01)

(56) References Cited

U.S. PATENT DOCUMENTS

| | | |
|---|---|---|
| 7,316,538 B2 | 1/2008 | Bouchy et al. |
| 2009/0154863 A1* | 6/2009 | Decerle ................. F01D 21/045 384/585 |

* cited by examiner

DEVICE FOR UNCOUPLING A BEARING CARRIER

BACKGROUND OF INVENTION

Field of Invention

The present invention relates to a device for uncoupling a carrier for a bearing of a rotary shaft in a turbomachine. A carrier such as this is able to break its connection with the turbomachine stator upon the onset of imbalance in order to avoid damage to the turbomachine.

Description of the Related Art

A turbomachine comprises, from upstream to downstream in the direction in which the gases flow, a compressor, a combustion chamber and a turbine. The purpose of the compressor is to raise the pressure of the air supplied to the combustion chamber. The purpose of the turbine is to tap off some of the pressure energy of the hot gases leaving the combustion chamber and convert it into mechanical energy to drive the rotation of the compressor.

For that purpose, the compressor and the turbine are made of a first set of fixed components that make up the stator and of a second set of components capable of being rotated relative to the stator and which make up the rotor.

The compressor rotor and the turbine rotor form an assembly which is securely connected by a rotary shaft. Rotation of the rotor with respect to the stator is rendered possible by means of bearings, a bearing being a mechanical component that supports and guides a rotor, particularly the shaft of this rotor. This bearing comprises a first part fixed to the rotor shaft and a second part fixed to the stator via a bearing carrier. A rolling bearing assembly is positioned between the two parts of the bearing thus allowing one part of the bearing to rotate relative to the other. The rolling bearing assembly may, for example, be of the ball bearing, cylindrical roller bearing, or taper roller bearing type.

A turbomachine may also be of the "twin-spool" type, which means that it has two rotors arranged coaxially, a bearing allowing relative rotation of one of these two rotors with respect to the other.

A turbomachine may also comprise a fan, that constitutes the first stage of the compressor. The fan has very large blades known as fan blades, which increase the mass and inertia of the rotor.

If a fan blade breaks, imbalance appears on the shaft supporting the fan. Imbalance is a phenomenon that affects the balance of the rotor, the center of gravity of which is no longer precisely on the axis of rotation as it should be. Cyclic loadings and substantial vibrations are therefore imparted to the turbomachine stator, via the bearing carrier, with a great risk of damage that could lead to self-destruction. In order to prevent these undesirable phenomena from being transmitted to the stator, it is necessary to uncouple the bearing carrier, that is to say to interrupt the mechanical transmission of rotation, notably by disconnecting the two parts that form the bearing carrier.

Document FR 2877046 describes a solution that consists in using bolted connections that can rupture in order to attach an upstream part and a downstream part that form a bearing carrier. The rupture screw of each bolted connection passes through an upstream hole of an upstream part and a downstream hole of a downstream part of a bearing carrier, the downstream part of the bearing carrier forming an integral part of the casing. The screw head of the rupture screw is adjacent to the hole of the upstream part and is in contact with this upstream part on a plane perpendicular to the axis of the hole. The portion of the rupture screw that passes through the hole is in contact with the inside of the hole via a centering portion and has a portion of reduced cross section liable to rupture when a predetermined tensile force is exceeded, thus uncoupling the two parts that make up the bearing carrier.

It will also be noted that with this type of bolted connection that can rupture, the longitudinal positioning of the low-pressure compressor shaft can be achieved via a thrust bearing, in the form for example of a ball bearing, between the drive shaft and the upstream part of the bearing carrier.

However, with such a rupture screw, when imbalance appears, the upstream part and the downstream part move relative to one another in a circular relative motion which has the effect of subjecting the rupture screw to shear loadings, because of the tangential contact around this rupture screw, and these may lead to uncontrolled rupturing of the rupture screws. Now, these rupture screws are designed for tensile loadings, and this has a deleterious effect on the uncoupling of the bearing carrier.

In order to improve control over the uncoupling function, document EP 2071 138 describes a solution which involves replacing the centering portion described in document FR 2877046 with a means referred to as a "dual-centering" means. This means may in practice consist of the collaboration of a groove and of a rib of complementing shapes, in contact with one another via their two flanks, thus offering two parallel contact surfaces. Such centering, by means of these two parallel surfaces, makes it possible to reduce, if not to eliminate entirely, the ovalizing deformation of the bearing carrier by maintaining permanent contact between the flanks of the groove and of the rib. In order to reduce further, if not to eliminate, the shear forces applied to the rupture screws, document EP 2071 138 also proposes eliminating any contact between each upstream hole and the rupture screw passing through it, allowing said rupture screws to be subjected only to tensile loadings, thus guaranteeing better control over the uncoupling of the bearing carrier.

However, the high axial thrust caused by the aerodynamic forces internal to the turbomachine dictates a need for a large-sized thrust bearing. Significant bulkiness generated by this thrust bearing means that said thrust bearing has to be installed on the downstream side of the bearing carrier, while a roller bearing is installed on the upstream side of said bearing carrier.

As a result, if blades are lost, the low-pressure compressor shaft is still held longitudinally by the thrust bearing of the downstream part of the bearing carrier. As the upstream bearing secured to the shaft is furthermore a roller bearing, no forward movement drives the upstream part of the bearing carrier. This then results in a risk that the upstream and downstream parts of the bearing carrier might not disengage, and the consequence of this would be that the imbalance generated by the loss of blades would be transmitted in full to the structures.

BRIEF SUMMARY OF THE INVENTION

It is an object of the invention to remedy these disadvantages and the invention therefore proposes a device for uncoupling a bearing carrier in a turbomachine, this uncoupling device being of the rupture screws type and making it possible, in the event of a loss of blades, not only to reduce the shear forces applied to the rupture screws, if not eliminate these forces, but also to guarantee that the bearing carrier uncouples.

To this end, according to the invention, the device for uncoupling a bearing carrier in a turbomachine, this bearing carrier comprising an upstream part and a downstream part comprising a plurality of upstream holes respectively facing a plurality of downstream holes, this uncoupling device comprising rupture screws each passing through an upstream hole and a downstream hole, and at least one dual-centering means for centering a rupture screw with respect to said upstream hole and to said downstream hole, respectively, is notable in that the dual-centering means:

is independent of the upstream and downstream parts of the bearing carrier and of the rupture screw, and is able to collaborate with the upstream part of the rupture screw so that when the rupture screw ruptures, the upstream part takes the dual-centering means with it.

Thus, by virtue of the invention, when the rupture screw ruptures, the distancing of the upstream part from the downstream part of the rupture screw is accompanied by the removal and distancing of the dual-centering means. The upstream part of the bearing carrier is therefore no longer centered on the downstream part of the bearing carrier, which means that these two parts of the bearing carrier are rapidly separated from one another. The uncoupling of the bearing carrier therefore occurs effectively and the forces generated by any imbalance are not transmitted to the structures.

In addition, by maintaining the use of a dual-centering means, it is possible to ensure that, when the rupture screw ruptures, the uncoupling between the upstream part and the downstream part of the bearing carrier occurs only as a result of tension and without a shear component, for even more effective uncoupling.

According to one particular embodiment, the dual-centering means is in the form of a tubular component the dimensions of the internal section of which are tailored to the dimensions of the upstream part of the rupture screw.

For preference, with the rupture screw comprising an upstream head and a downstream shank, the dual-centering means has a shoulder which is transverse with respect to the head of said rupture screw. Thus, the screw head—and consequently the upstream part of the screw—is surrounded and therefore transversely immobilized by the dual-centering means.

For preference also, the dual-centering means has an intermediate portion intended to form a clearance between an upstream hole and the rupture screw that passes through it, so as to prevent any contact between said upstream hole and said rupture screw. Thus, a movement of the upstream part of the bearing carrier does not also take a rupture screw with it as a result of a tangential contact around the rupture screw, and this means that the rupture screw can be made even less subject to shear forces and thereby offers better control over the uncoupling of the bearing carrier.

In order for the dual-centering means to act as an intermediary between the bearing carrier and the rupture screw in order to perform the function of centering the two holes, this dual-centering means may have a cylindrical portion able, on the one hand, to pass through an upstream hole and a downstream hole and, on the other hand, to have the rupture screw at least partially passing through it.

In one particularly advantageous embodiment, the dual-centering means has a longitudinal securing portion for securing said dual-centering means to the upstream part of the rupture screw. Thus, the dual-centering means is secured longitudinally, namely in the direction in which the gases flow which also corresponds to the direction of relative movement of the two separated parts of the rupture screw (and to the direction of the axis of the upstream and downstream holes of the bearing carrier), to the upstream part of the rupture screw so that this dual-centering means is taken with the upstream part of the rupture screw when said upstream part moves away.

According to one particular embodiment of the longitudinal securing portion, this portion is in the form of a flap situated at the upstream end of the dual-centering means.

In order to perform the rupture-screw function, the rupture screw may have at least one thinner portion so as to form, upon the rupturing of said rupture screw, on the one hand, an upstream part and, on the other hand, a downstream part of said rupture screw.

In that case, given that the rupture screw comprises an upstream head and a downstream shank, the thinner portion is preferably located in the region of the shank.

The present invention also relates to a turbomachine comprising a device for uncoupling a bearing carrier according to one of the embodiments described above.

BRIEF DESCRIPTION OF THE DRAWINGS

The invention will be better understood with the aid of the attached drawing in which.

DETAILED DESCRIPTION OF THE INVENTION

To make the figures easier to understand, identical numerical references will be used to denote technical elements which are similar.

Figure 1:
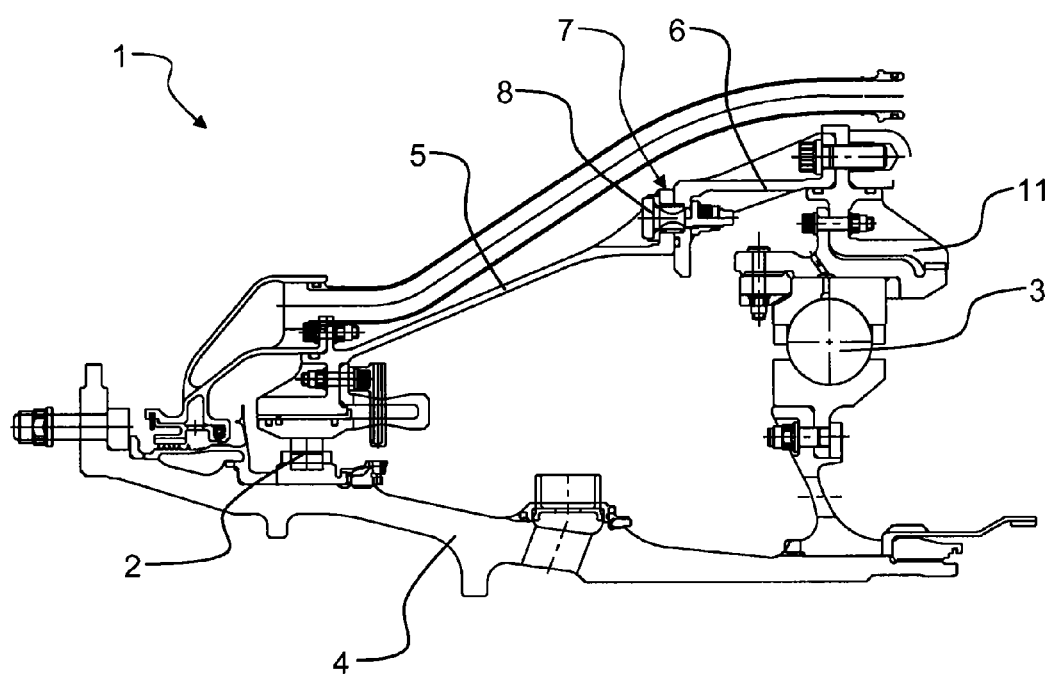
FIG. 1 is a schematic view in axial section of a bearing carrier equipped with an uncoupling device according to a first embodiment of the invention.

FIG. 1 depicts a turbomachine 1 comprising a drive shaft 4, for example a low-pressure compressor drive shaft, driving a rotor (not depicted) in rotation about the axis of the turbomachine. This shaft is supported here by two bearings, respectively an upstream bearing 2 and a downstream bearing 3 which are connected to one another at a bearing carrier 7, of essentially frustoconical shape. The bearing 2 is a roller bearing and the bearing 3 is a thrust bearing, of the ball bearing type.

The bearings 2 and 3 are connected respectively to a first component 5 and to a second component 11. The two components 5 and 11 are connected respectively to two ends of a component 6 of the fixed structure of the turbomachine.

The components 6 and 11 are joined together by bolts of the non-rupturing type. The connection between the components 5 and 6 forms the bearing carrier 7, where a plurality of longitudinal rupture screws is located, these together forming a part of the uncoupling device according to the invention. One of these rupture screws carries the reference 8 in FIG. 1.

Figure 2:
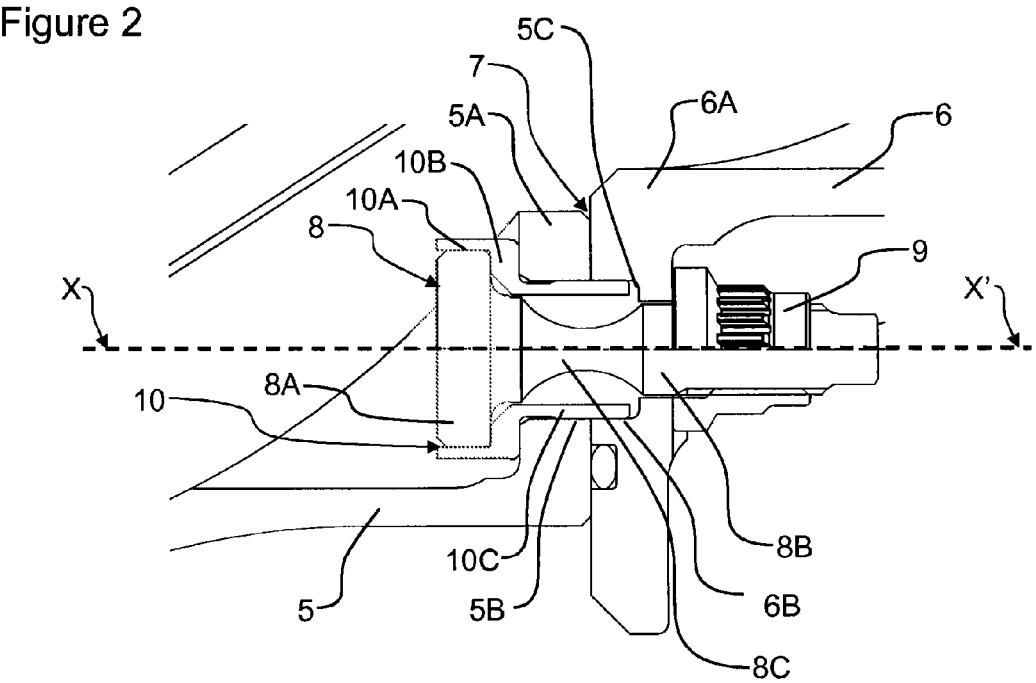
FIG. 2 is a schematic view in axial section of the uncoupling device of the bearing carrier of FIG. 1, before the rupture screw ruptures.

The uncoupling device according to the invention is depicted in greater detail in FIG. 2. In this figure, the bearing carrier 7 is formed of two ends 5A and 6A—referred to hereinafter respectively as the upstream and downstream parts of the bearing carrier—and of the two components 5 and 6, which are themselves connected to the two bearings 2 and 3 respectively.

Arranged in the vicinity of these upstream 5A and downstream 6A parts of the bearing carrier are the respectively upstream 5B and downstream 6B holes of equal sizes through which a bolted connection of the rupture screw type of the uncoupling device according to the invention is intended to pass. This bolted connection is made up of a rupture screw 8 (described in ample detail in document FR 2 877 046) which passes through the holes 5B and 6B, and of a nut 9 intended to collaborate with the screw 8 in order to hold the upstream 5A and downstream 6A parts of the bearing carrier 7 firmly together.

The rupture screw 8 has a screw head 8A positioned facing the upstream part 5A of the bearing carrier, the nut 9 being arranged at the opposite end to this head 8A, namely facing the downstream part 6A of the bearing carrier. The screw 8 also comprises a screw shank 8B, of which a first portion, situated at the opposite end to the head 8A, is intended to pass through the nut 9, and a second portion 8C, situated between the head 8A and said first part, has a thinner cross section. The dimension of the reduced cross section of this portion 8C is determined in such a way that said portion 8C is able to rupture when a predetermined tensile force is exceeded, for example as a result of imbalance occurring upon blade loss, so that the uncoupling of the upstream 5A and downstream 6A parts of the bearing carrier occurs at said thinner portion 8C.

In order to center the rupture screw 8 and the upstream 5B and downstream 6B holes of the bearing carrier, the uncoupling device according to the invention also comprises a dual-centering means 10 for centering the rupture screw 8 with respect to the upstream hole 5B and the downstream hole 6B respectively. This means 10 consists of a component which is independent, firstly, of the rupture screw 8 and, secondly, of the bearing carrier 7 (particularly of the upstream 5A and downstream 6A parts of the bearing carrier 7).

This dual-centering means 10 takes the form of a tubular component of which:
  the internal cross section, which is variable, is tailored to the dimensions of the upstream part of the rupture screw 8, particularly of the screw head 8A and of the shank 8B; and
  the external cross section, which is likewise variable, is tailored to the dimensions of the upstream 5B and downstream 6B holes.

More specifically, this tubular component 10 first of all, upstream, has a first tubular portion 10A the internal cross section of which is tailored to the screw head 8A. The component 10 also has a portion 10B forming a transverse shoulder of said screw head.

The component 10 also has, downstream, a second tubular portion 10C of a dimension smaller than that of the portion 10A and of which the internal and external cross sections are configured such that this portion 10C on the one hand passes through the upstream 5B and downstream 6B holes and on the other hand has at least part of the rupture screw 8, and at the very least the shank 8B, passing through it.

Thus, through the intermediary of this portion 10C, the component 10 performs the dual-centering of the upstream 5A and downstream 6A parts of the bearing carrier 7 merely by inserting said portion 10C in the upstream holes 5B and downstream 6B brought into register with one another beforehand.

There is thus no longer any need to resort to a dual centering of the upstream and downstream parts of the bearing carrier using a system of grooves and ribs of complementing shapes made directly on said upstream and downstream parts, such a system in fact having the disadvantage of being liable to impede the relative transverse movement of the components 5 and 6 with respect to one another once the rupture screw has broken.

On the contrary, by using an independent dual-centering means such as the tubular component 10, the dual-centering function of centering the components 5 and 6 relative to one another is performed without the structures of these components being altered, as such alteration could have impaired their uncoupling effectiveness. In addition, this independent component 10 can be taken with the screw head 8A when the screw 8 breaks so that, when said rupture screw 8 ruptures, the dual-centering function of centering the components 5 and 6 is deactivated and said components 5 and 6 are free to move with respect to one another, both longitudinally and transversely.

What is more, again through the use of an independent dual-centering means, the dual-centering function is no longer performed by the rupture screws, because if it were, that would have the disadvantage of subjecting the rupture screws to shear forces in addition to the usual tensile forces.

The dual-centering means 10 also has an intermediate portion 10B situated between the first portion 10A and the second portion 10C. This intermediate portion 10B has an external section substantially equal to that of the portion 10A and an internal cross section substantially equal to that of the portion 10C. This portion 10B, the external cross section of which is thus greater than the dimensions of the upstream holes 5B and downstream 6B, butts against the upstream part 5A of the bearing carrier 7 when the bolted connection 8-9 is clamping the bearing carrier 7.

The longitudinal thickness of this portion 10B determines a clearance between the upstream hole 5B and the rupture screw 8 passing through it (particularly the screw head 8A), this clearance making it possible to avoid any contact between said upstream hole 5B and said screw head 8A. For preference, this longitudinal thickness is determined so that the clearance thus formed prevents any shear forces being applied to the rupture screw 8 in the event of imbalance.

According to another embodiment, the dual-centering means may be produced as a plurality of components joined together, provided that these components are independent of the rupture screw and of the bearing carrier 7 and provided that these components are accompanied by the upstream part of the rupture screw 8 when the latter has broken.

Figure 3:
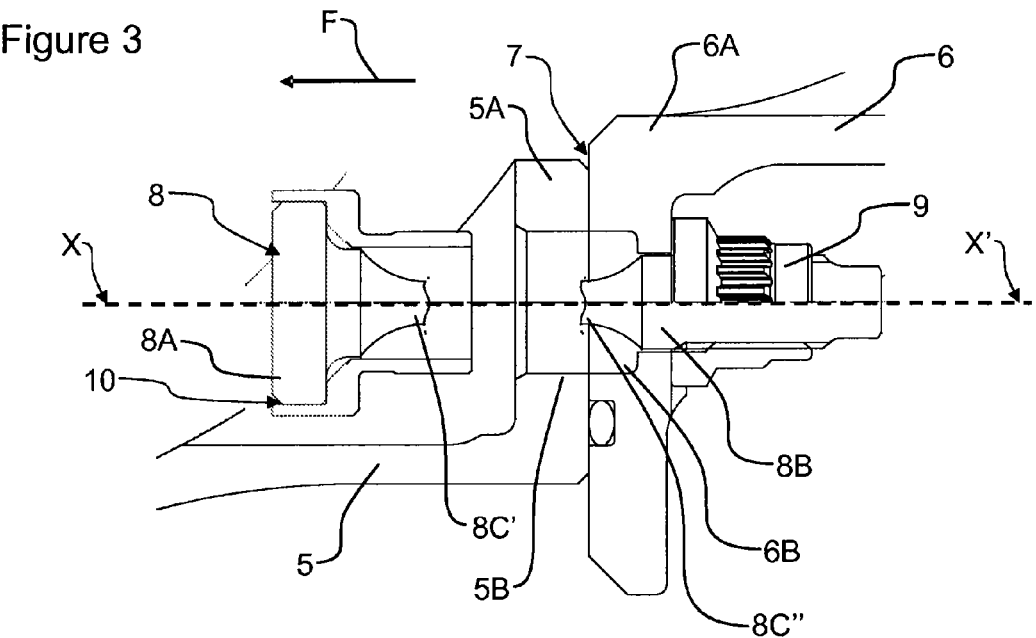
FIG. 3 is a schematic view in axial section of the uncoupling device of FIG. 2, after the rupture screw has ruptured.

The rupture of the rupture screw 8 is illustrated in FIG. 3. When imbalance appears, the thinner portion 8C of the rupture screw 8 is broken under the effect of the tensile forces generated by the imbalance, this portion 8C thus separating into two sub-portions, these respectively being an upstream sub-portion 8C' and a downstream sub-portion 8C". Still under the effect of these tensile forces and because the rupture screw 8 is ruptured, the upstream part of said rupture screw—in this instance formed of the screw head 8A and of the upstream sub-portion 8C'—moves away from bearing carrier 7 in the direction of the arrow F, which occurs along the longitudinal axis X-X' of the rupture-screw bolted connection 8-9. This longitudinal separation movement of the upstream part of the screw 8 causes longitudinal separation of the dual-centering component 10, which from then on no longer passes through the holes 5B and 6B and frees the upstream 5A and downstream 5B parts of the bearing carrier to undergo relative motion both longitudinally (along the axis X-X') and transversely (perpendicular to the axis X-X').

Figure 4:
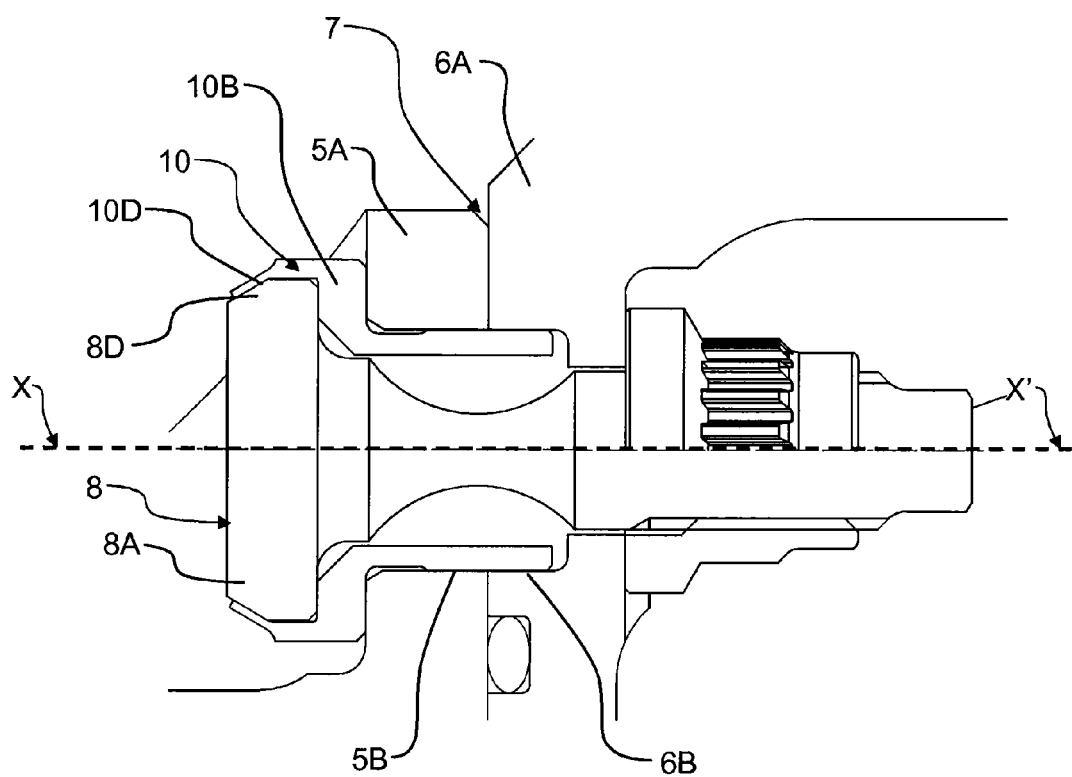
FIG. 4 is a schematic view in axial section of an uncoupling device according to a second embodiment of the invention.

According to a second embodiment of the dual-centering means 10, which is illustrated in FIG. 4, this means is extended, at the end of the upstream portion 10A, by an additional portion 10D to secure the rupture screw 8 longitudinally (in the direction of the axis X-X') to the dual-centering component 10 when said screw 8 is passing through said component 10 and the screw head 8A is in abutment against the intermediate portion 10B.

This additional portion 10D is in the form of a flexible flap able to adopt two successive positions:

a first position in which the flap 10D forms an extension of the portion 10A in the direction of the longitudinal axis X-X', so that the screw 8 can be inserted into the component 10; and a second position in which the flap 10D is folded down at least partially in the transverse direction (perpendicular to the axis X-X') so that said flap 10D butts against the part of the screw head 8A situated on the opposite side to that part of said screw head that butts against the intermediate portion 10B.

In that way, when the rupture screw 8 is inserted into the dual-centering means 10, the intermediate portion 10B and the additional longitudinal securing portion 10D butt against the screw head 8A and thus allow said screw head 8A and, as a result, the rupture screw 8, to be immobilized longitudinally. This then ensures that, when the rupture screw 8 has broken, the separating movement of the upstream part of the screw 8 is accompanied, at the same time and at the same speed, by the separation of the dual-centering component 10, and this has the effect of uncoupling the upstream 5A and downstream 6A parts of the bearing carrier 7 more quickly.

As depicted in FIG. 4, a recess 8D may be made in the portion of the screw head 8A onto which the flap 10D is intended to butt, so that the inclination of said flap 10D is between 0° and 90° with respect to the longitudinal axis X-X'. In another embodiment, it is possible for no recess to be made, such that the flap 10D will need to be bent to make an angle of 90° with respect to the axis X-X'. In any event, a person skilled in the art will be able to determine what inclination he wishes to confer upon the flaps bearing in mind, if appropriate, on the one hand, the desirable longitudinal securing force between the screw 8 and the component 10 and, on the other hand, the ease with which the portion 10D can be bent over.

The invention claimed is:

1. A bearing carrier for a turbomachine, the bearing carrier comprising:

an upstream part and a downstream part comprising a plurality of upstream holes respectively facing a plurality of downstream holes; and an uncoupling device for uncoupling the bearing carrier, the uncoupling device comprising
rupture screws each passing through one of the upstream holes and one of the downstream holes, and a dual-centering device which centers a rupture screw with respect to said one of the upstream holes and to said one of the downstream holes, respectively, wherein the dual-centering device is independent of the upstream and downstream parts of the bearing carrier and of the rupture screw, and is configured to collaborate with an upstream part of the rupture screw so that when the rupture screw ruptures, the upstream part of the rupture screw takes the dual-centering device with the upstream part of the rupture screw, wherein the dual-centering device includes a first tubular portion, a second tubular portion, and a transverse portion connecting the first and second tubular portions, wherein an outer diameter of the first tubular portion is greater than an outer diameter of the second tubular portion, and an inner diameter of the first tubular portion is greater than an inner diameter of the second tubular portion, and wherein, when the rupture screw is not ruptured, the second tubular portion is inserted into said one of the upstream holes and said one of the downstream holes, and a shank of the rupture screw passes through the dual-centering device, and a most downstream face of the upstream part and a most upstream face of the downstream part are co-planar, and at the same axial location.

2. The bearing carrier as claimed in claim 1, wherein dimensions of an internal section of the dual-centering device are tailored to dimensions of the upstream part of the rupture screw.

3. The bearing carrier as claimed in claim 1, wherein the rupture screw comprises a head, and the transverse portion of the dual-centering device is transverse with respect to the head of the rupture screw.

4. The bearing carrier as claimed in claim 1, wherein the transverse portion of the dual-centering device is configured to form a clearance between said one of the upstream holes and the rupture screw that passes therethrough, so as to prevent any contact between said one of the upstream holes and the rupture screw.

5. The bearing carrier as claimed in claim 1, wherein the dual-centering device includes a longitudinal securing portion for securing the dual-centering device to the upstream part of the rupture screw.

6. The bearing carrier as claimed in claim 5, wherein the longitudinal securing portion is in a form of a flap situated at an upstream end of the dual-centering device.

7. The bearing carrier as claimed in claim 1, wherein the rupture screw includes at least one thinner portion so as to form, upon the rupturing of the rupture screw, the upstream part and a downstream part of the rupture screw.

8. The bearing carrier as claimed in claim 7, wherein the rupture screw comprises a head and the shank, and the at least one thinner portion is located in a region of the shank.

9. A turbomachine comprising a bearing carrier as claimed in claim 1.

* * * * *